(12) United States Patent
Li

(10) Patent No.: US 11,675,701 B2
(45) Date of Patent: *Jun. 13, 2023

(54) HARDWARE-BASED COHERENCY CHECKING TECHNIQUES

(71) Applicant: Micron Technology, Inc., Boise, ID (US)

(72) Inventor: Yun Li, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/469,342

(22) Filed: Sep. 8, 2021

(65) Prior Publication Data

US 2021/0406182 A1  Dec. 30, 2021

Related U.S. Application Data

(63) Continuation of application No. 16/809,036, filed on Mar. 4, 2020, now Pat. No. 11,138,115.

(51) Int. Cl.
*G06F 12/08* (2016.01)
*G06F 12/0831* (2016.01)
*G06F 12/02* (2006.01)

(52) U.S. Cl.
CPC ...... *G06F 12/0831* (2013.01); *G06F 12/0246* (2013.01); *G06F 2212/7208* (2013.01)

(58) Field of Classification Search
None
See application file for complete search history.

(56) References Cited

U.S. PATENT DOCUMENTS

| | | | | |
|---|---|---|---|---|
| 5,404,482 A | * | 4/1995 | Stamm | G06F 12/0831 |
| | | | | 711/E12.04 |
| 6,886,063 B1 | * | 4/2005 | Rustad | G06F 9/52 |
| | | | | 710/200 |
| 7,080,213 B2 | * | 7/2006 | Grenholm | G06F 12/0815 |
| | | | | 711/119 |
| 2002/0147719 A1 | * | 10/2002 | Zhang | G06F 16/10 |
| | | | | 707/999.009 |
| 2007/0079075 A1 | * | 4/2007 | Collier | G06F 12/0822 |
| | | | | 711/146 |
| 2007/0226447 A1 | * | 9/2007 | Shimozono | G06F 3/0644 |
| | | | | 711/170 |
| 2018/0373632 A1 | * | 12/2018 | Wilkerson | G06F 12/0862 |

\* cited by examiner

*Primary Examiner* — Kevin Verbrugge
(74) *Attorney, Agent, or Firm* — Holland & Hart LLP

(57) ABSTRACT

Methods, systems, and devices for hardware-based coherency checking techniques are described. A memory subsystem with hardware-based coherency checking can include a coherency block that maintains a coherency lock and releases coherency upon completion of a write command. The coherency block can perform operations to lock coherency associated with the write command, monitor for completion of the write to the memory device(s), release the coherency lock, and update one or more records used to monitor coherency associated with the write command. A coherency command and coherency status can be provided through a dedicated hardware bridge, such as a bridge through a level-zero cache coupled with the coherency hardware.

20 Claims, 5 Drawing Sheets

HARDWARE-BASED COHERENCY CHECKING TECHNIQUES

CROSS REFERENCE

The present Application for Patent is a continuation of U.S. patent application Ser. No. 16/809,036 by Li, entitled "HARDWARE-BASED COHERENCY CHECKING TECHNIQUES" filed Mar. 4, 2020, assigned to the assignee hereof, and is expressly incorporated by reference in its entirety herein.

TECHNICAL FIELD

The following relates generally to a memory sub-system and more specifically to hardware-based coherency checking techniques for a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
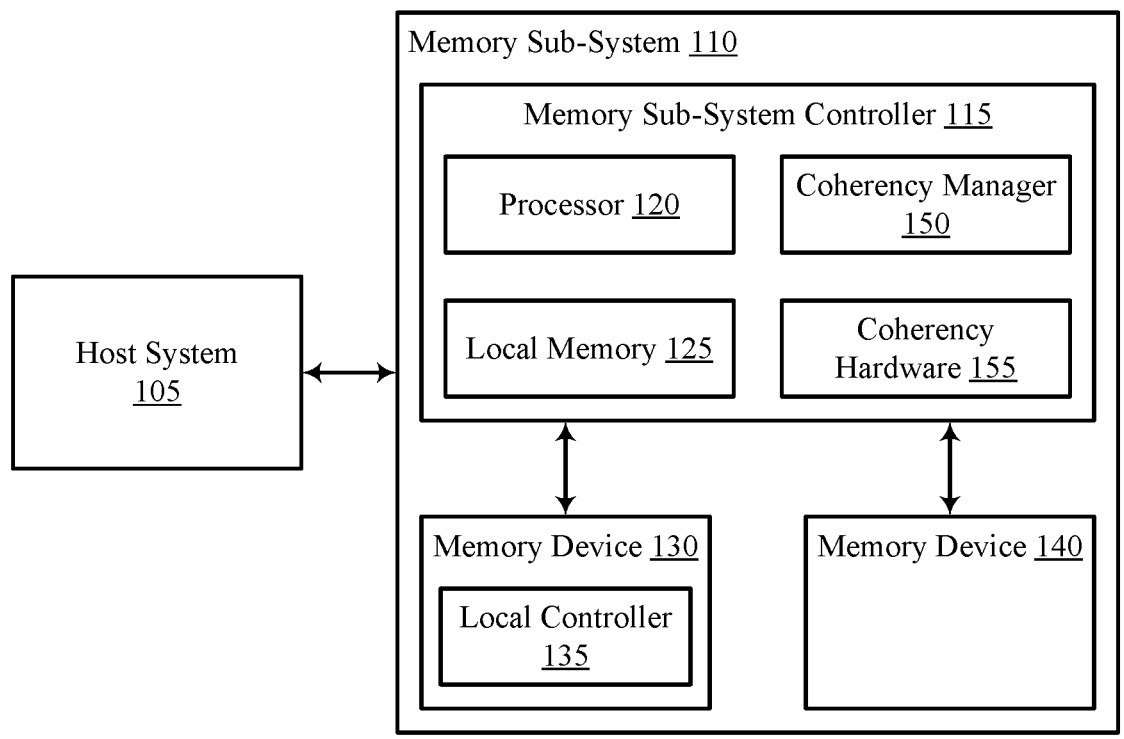
FIG. 1 illustrates an example of a computing system that includes a memory sub-system in accordance with some examples of the present disclosure.

Aspects of the present disclosure are directed to hardware-based coherency checking techniques. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory sub-system controller. Each die can consist of one or more planes. Planes can be groups into logic units (LUN). For some types of non-volatile memory devices (e.g., NAND memory devices), each plane consists of a set of physical blocks, which are groups of memory cells to store data. A cell is an electronic circuit that stores information. A block hereinafter refers to a unit of the memory device used to store data and can include a group of memory cells, a word line group, a word line, or individual memory cells.

Each block consists of a set of pages. Each page consists of a set of memory cells, which store bits of data. For some memory devices, such as NAND devices, blocks are the smallest area than can be erased and pages within the blocks cannot be erased individually. For such devices, erase operations are performed one block at a time. Multiple blocks can be included in a single plane, and multiple planes can be included in a memory die (e.g., a LUN). In some memory sub-systems, a logical block can be associated with one or more hardware blocks, and can correspond to a smallest size of a host transfer unit (TU), where a TU can include one or more logical blocks. Logical blocks can be addressed by a logical block address (LBA).

In traditional access operations of memory sub-systems, commands associated with different access operations (e.g., read operations, write operations, etc.) can be constantly transmitted by the host system and received by the memory sub-system. For example, a write command can be transmitted for one or more TUs with data that is to be written. Further, a read command can be transmitted requesting data from one or more TUs. Conventionally, upon receiving a write command, firmware at a memory sub-system can update a mapping table to associate a physical memory location with a TU, and then write the data to a memory device (e.g., NAND memory device). Because the mapping table is updated prior to data actually being physically written to NAND memory, traditionally such firmware will perform coherency operations to prevent data from being read from a NAND memory location prior to the data actually being written to the NAND memory location.

For example, if a first write command spans a first set of TUs, and a read command is received for a second set of TUs that overlap the first set of TUs, the coherency operations prevent the overlapping TUs from being read from the NAND memory before they are actually written pursuant to the write command. Thus, for each write operation, the firmware performs operations to update the mapping table for a TU, lock coherency for a TU, perform the write to the physical memory device(s), and release the coherency lock. Further, for each read operation, the firmware performs operations to check the coherency for the associated TUs to be read. Such coherency operations performed by the firmware thus consume a number of processing cycles of a processor used to perform the coherency operations. Accordingly, traditional coherency operations can result in system resources being used for coherency locking, unlocking, and checking, which can increase latency for other operations to be performed at the memory sub-system. Thus a system to effectively manage coherency at a hardware level can be beneficial.

Aspects of the present disclosure address the above and other deficiencies by providing a memory sub-system with hardware-based coherency checking in which a coherency block maintains a coherency lock and releases coherency upon completion of a write command. Hardware-based coherency checking such as provided herein can substantially reduce the processing overhead associated with firmware implementation of coherency checking. For example, a memory sub-system can include coherency hardware that allows firmware at a processing device to simply provide an indication of write to a coherency block, and the coherency hardware performs operations to lock coherency associated with the write command, monitor for completion of the write to the memory device(s), release the coherency lock, and update one or more records used to monitor coherency associated with the write command. Thus, the processing device can perform various other tasks while the coherency hardware is performing coherency-related operations, which can enhance system efficiency and performance. Further, in some examples, a coherency command from the processing device can be provided through a dedicated hardware bridge, such as a bridge through a level-zero cache coupled with the processing device and the coherency hardware, which can further enhance performance by allowing a direct write of a coherency command and a direct read of a coherency status rather than providing the coherency command indirectly through a bus.

Thus, hardware-based coherency checking as described in various aspects of the present disclosure allows a processing device to provide a single coherency command rather than typical firmware-based coherency operations of providing a coherency lock, determining that the associated write operation is complete, releasing the coherency lock responsive to the write operation being complete, and releasing an associated buffer and/or address location associated with the write operation. Providing a single command to the coherency hardware can thus substantially reduce the processing overhead of the processing device associated with coherency operations.

Further, in examples where the processing device can provide the single coherency command through a dedicated hardware bridge (e.g., a level-zero cache), processing overhead can be further reduced due to the processor not having to format the command for transmission over a bus that couples the processor with the coherency hardware. Instead, the processor can asynchronously issue the coherency command via the dedicated hardware bridge. Additionally, such a dedicated hardware bridge can allow the processor to avoid having to wait for bus access and hence asynchronously issue the coherency command, which can reduce latency associated with a coherency lock and write operation. Consequently, a single coherency command to coherency hardware via a dedicated hardware bridge avoids processing overhead of a number of different coherency operations as well as associated time and processing overhead related to bus access and formatting operations.

Features of the disclosure are initially described in the context of a computing environment as described with reference to FIG. 1. Features of the disclosure are described in the context of method diagrams and sub-systems with hardware-based coherency components as described with reference to FIGS. 2 through 4. These and other features of the disclosure are further illustrated by and described with reference to a computer system that provides hardware-based coherency checking as described with reference to FIG. 5.

FIG. 1 illustrates an example computing system 100 that includes a memory sub-system 110 in accordance with some embodiments of the present disclosure. The memory sub-system 110 can include media, such as one or more non-volatile memory devices (e.g., memory device(s) 130), one or more volatile memory devices (e.g., memory device(s) 140), or a combination thereof.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile DIMM (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 105 that is coupled with one or more memory sub-systems 110. In some examples, the host system 105 is coupled with different types of memory sub-systems 110. FIG. 1 illustrates one example of a host system 105 coupled with one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 105 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 105 uses the memory sub-system 110, for example, to write data to the memory sub-system 110 and read data from the memory sub-system 110.

The host system 105 can be coupled to the memory sub-system 110 using a physical host interface. Examples of a physical host interface include, but are not limited to, a serial advanced technology attachment (SATA) interface, a peripheral component interconnect express (PCIe) interface, universal serial bus (USB) interface, Fiber Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 105 and the memory sub-system 110. The host system 105 can further utilize a non-volatile memory Express (NVMe) interface to access components (e.g., memory device(s) 130) when the memory sub-system 110 is coupled with the host system 105 by the PCIe interface. The physical host interface can provide an interface for passing control, address, data, and other signals between the memory sub-system 110 and the host system 105. FIG. 1 illustrates a memory sub-system 110 as an example. In general, the host system 105 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device(s) 140) can be, but are not limited to, random access memory (RAM), such as dynamic RAM (DRAM) and synchronous DRAM (SDRAM).

Some examples of non-volatile memory devices (e.g., memory device(s) 130) includes a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable ROM (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), a digital signal processor (DSP)), or other suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions (e.g., firmware) for performing various processes, operations, logic flows, and routines that control operation of the memory sub-system 110, including handling communications between the memory sub-system 110 and the host system 105.

In some examples, the local memory 125 can include memory registers storing memory pointers, fetched data, etc. The local memory 125 can also include ROM for storing micro-code. While the example memory sub-system 110 in FIG. 1 has been illustrated as including the memory sub-system controller 115, in another example of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 105 via the physical host interface. The host interface circuitry can convert the commands received from the host system into command instructions to access the memory devices 130 and/or the memory device 140 as well as convert responses associated with the memory devices 130 and/or the memory device 140 into information for the host system 105.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a coherency manager 150 and coherency hardware 155 that perform coherency functions for access operations such as read or write operations. For example, coherency manager 150 can provide a coherency command to lock coherency for a logical address within memory device 130 as part of a write operation for the logical address (e.g., a systag that may be mapped to a 512 byte LBA of memory device 130). The coherency manager 150 can provide the coherency command to the coherency hardware 155, which can then perform a number of coherency operations without involvement of the coherency manager 150 or processor 120. For example, the coherency hardware 155, upon receiving the logical address, can identify a slot identification associated with the logical address (e.g., a 4096 byte slot or TU that can include the logical address). The coherency hardware 155 can identify an entry in a coherency record (e.g., based on a mapping provided in a coherency index or systag allocation block), and lock the identified entry in the coherency record. Such a lock can be provided by updating the coherency record to indicate the identified entry is locked (e.g., by placing a systag index into a systag table). The data associated with the write command can be placed into a slot buffer while being written to memory device 130 and, when the write to the memory device 130 is complete, the slot buffer can provide an indication that the coherency hardware 155 can use to release the entry in the coherency record.

In the event that a read command is received at the memory sub-system 110, the memory sub-system controller 115 can check coherency for a logical address of the read command (e.g., the LBA of the read command). For example, the processor 120 can request a coherency status from the coherency manager 150. The coherency manager, in such an event, can check the coherency record to determine of the logical address is locked. In the event that the logical address is not locked at the coherency hardware 155, a coherency miss can be indication and the read command can be passed to the memory device 130 to read data stored at the logical address. In the event that the logical address is locked at the coherency hardware 155, a coherency hit can be indicated which may cause the processor 120 to wait or to determine if the read data can be obtained from another source.

In some examples, the memory sub-system controller 115 includes at least a portion of the coherency manager 150. For example, the memory sub-system controller 115 can include a processor 120 (e.g., a processing device) configured to execute instructions stored in local memory 125 for performing the operations described herein. In some examples, the coherency manager 150 is part of the host system 105, an application, or an operating system. Further details with regards to the operations of the coherency manager 150 and coherency hardware are described below.

Figure 2:
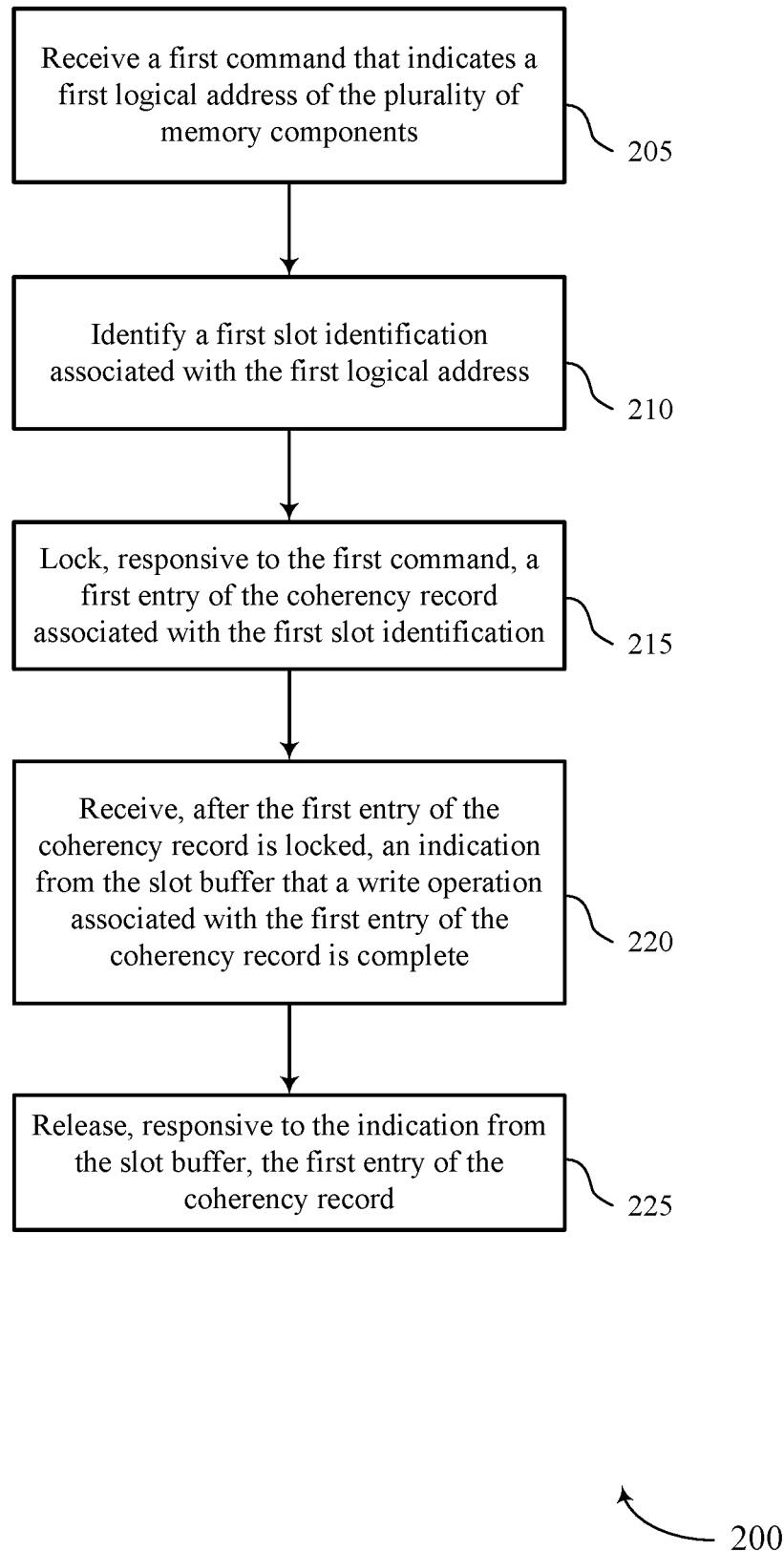
FIG. 2 is a flow diagram of an example method for hardware-based coherency checking techniques in accordance with some examples of the present disclosure.

FIG. 2 is a flow diagram of an example method 200 of a hardware-based coherency checking technique in accordance with some examples of the present disclosure. The method 200 can be performed by processing logic of a memory sub-system controller that can include hardware (e.g., processing device, circuitry, dedicated logic, programmable logic, microcode, hardware of a device, integrated circuit, etc.), software (e.g., instructions run or executed on a processing device), or a combination thereof. In some examples, the method 200 is performed by the coherency manager 150 and coherency hardware 155 of FIG. 1. Although shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

At operation 205, the processing logic can receive a first command that indicates a first logical address (e.g., a LBA) of a memory component coupled with the memory sub-system controller. In some examples, the first command is a write command having associated data that is to be written at the first logical address of the memory component. In some examples, the first logical address can be identified by a systag that is mapped to a LBA of the memory component (e.g., a 512 byte LBA that is indexed by a systag allocation component).

In some examples, the processing logic can receive the first command in a command queue of a coherency block within the coherency hardware. The first command can be provided, in some examples, by the coherency manager in response to receiving a write command. In some examples, the command queue can be located in a level-zero cache that is coupled with the coherency block and the processing logic. In such examples, the processing logic can write the first command to the command queue asynchronously relative to transmissions via a system bus that is coupled with the processing logic.

At operation 210, the processing logic can identify a first slot identification associated with the first logical address. In some examples, the first slot identification is a buffer slot index provided by a slot index block of the processing logic. In some examples, the first logical address can be provided by a logical address allocation block (e.g., a systag allocation block associated with a TU) of the processing logic, and a coherency record can be maintained in a logical address record storage block (e.g., a systag table) of the processing logic.

At operation 215, the processing device can lock, responsive to the first command, a first entry of the coherency record associated with the first slot identification. In some examples, the coherency record can include an entry in a table (e.g., a systag table) that indicates an index value associated with the first slot identification.

In some examples, the processing device can receive, after the first entry of the coherency record is locked and prior to a release of the first entry of the coherency record, a coherency check associated with the first slot identification, and can output, responsive to the coherency check, an indication that the first slot identification is locked and the first logical address. In some examples, the indication that the first slot identification is locked and the first logical address is provided to a status queue of the coherency block that is located in the level-zero cache coupled with the coherency block and the processing device.

At operation 220, the processing device can receive, after the first entry of the coherency record is locked, an indication from a slot buffer that a write operation associated with the first entry of the coherency record is complete. In some examples, each slot identification can be associated with a 4096 byte slot that can include multiple logical address, and the slot buffer can provide an indication for each slot identification as the slots are written to the memory device(s).

At operation 225, the processing device can release, responsive to the indication from the slot buffer, the first entry of the coherency record. In some examples, the coherency block can receive the indication from the slot buffer, and identify one or more logical addresses associated with the first slot identification, including the first logical address, and update a status associated with the first logical address to indicate that coherency is unlocked for the one or more logical addresses. In some examples, the processing device can receive, after the first entry of the coherency record is released, a second command that indicates a coherency check associated with the first slot identification, and output an indication of a coherency miss for the first slot identification.

Figure 3:
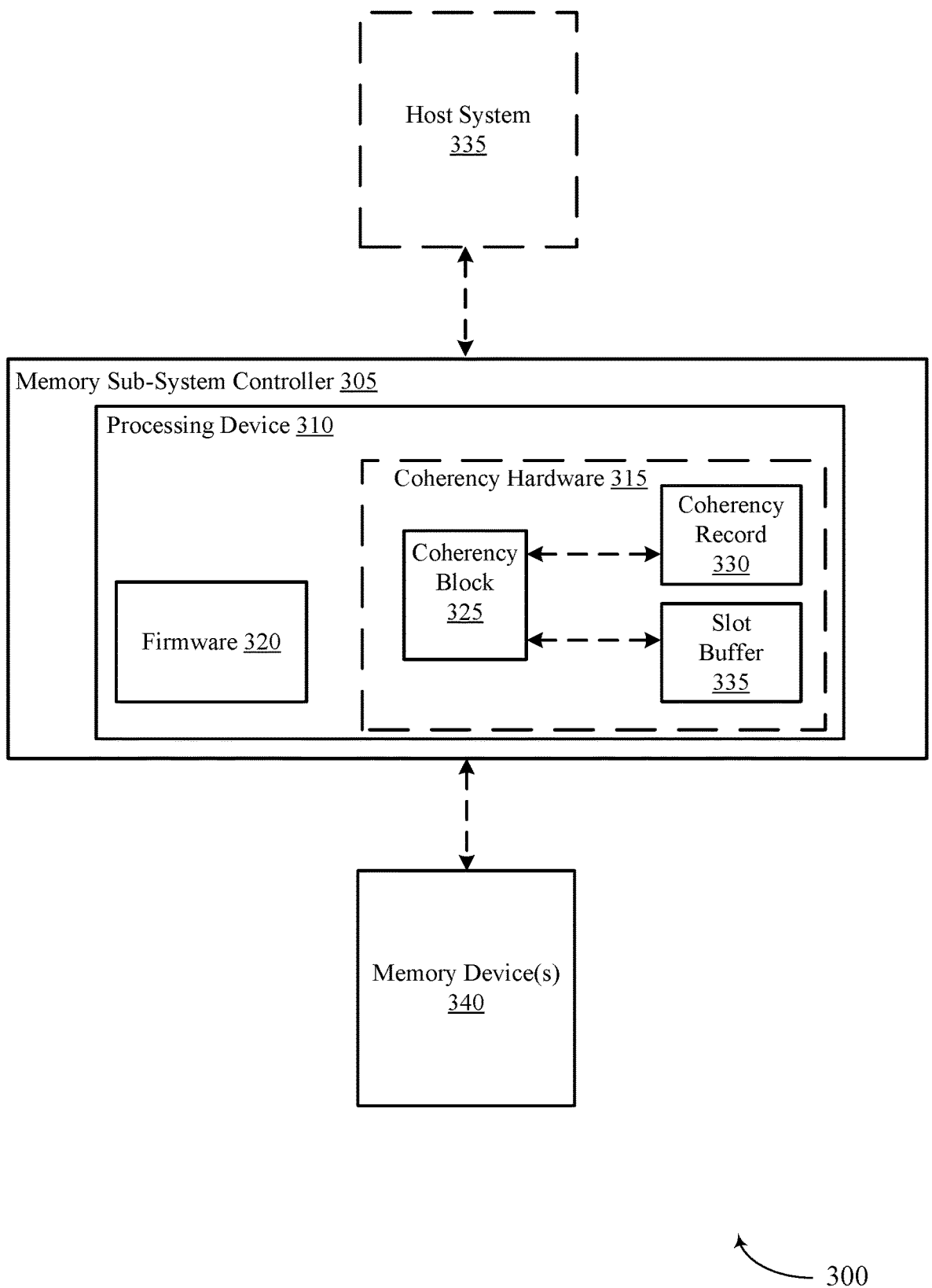
FIG. 3 is an example of coherency hardware of a memory sub-system in accordance with some examples of the present disclosure.

FIG. 3 illustrates an example of a memory sub-system 300 for hardware-based coherency checking in accordance with some examples of the present disclosure. The memory sub-system 300 can include a memory sub-system controller 305 and one or more memory devices 340. The memory sub-system controller 305 can receive memory commands from a host system 345, in some examples. In some examples, the memory sub-system controller 305 can be an example of a memory sub-system controller 115 of FIG. 1, and can execute operations such as described with reference to FIG. 2.

In the example of FIG. 3, the memory sub-system controller 305 can include a processing device 310 that can operate according to instructions in firmware 320. The memory sub-system controller 305 in this example also includes coherency hardware 315. The coherency hardware 315 can perform coherency operations, in some examples, based on a single coherency command that is provided by firmware 320. For example, a coherency block 325 within the coherency hardware 315 can receive a coherency command from a central processing unit (CPU) of the processing device 310 that is operating according to instructions in firmware 320. The firmware 320, after the coherency command is provided to the coherency hardware 315, can proceed to perform other functions unrelated to the particular coherency command, which can provide for fewer CPU cycles being consumed for coherency operations than traditional systems in which firmware includes operations to add a coherency lock for a write, to the write operation, release the coherency lock, release a buffer associated with the write, and release a logical address associated with the write. Thus, the single coherency command of various aspects of the present disclosure can substantially reduce processing overhead relative to cases where firmware includes instructions to handle all coherency-related operations.

In the example, of FIG. 3, the coherency block 325 is coupled with a coherency record 330 and a slot buffer 335. In some examples, the host system 345 can issue a write command that is received at the memory sub-system controller 305. As indicated, the firmware 320 can cause the processing device 310 to provide the coherency command to the coherency hardware 315. In such cases, the coherency block 325 can receive the coherency command, which can include a logical address associated with the write operation. In some examples, the coherency block 325 can access a coherency record 330 based on a mapping between logical addresses and slot addresses that represent slots that can be written to and read from memory device(s) 340 (e.g., a mapping provided by an allocation block or an index between logical addresses and slot addresses). The coherency block 325 can update the coherency record 330 to indicate that the slot address associated with the logical address is locked. A slot buffer 335 can manage read and write operations, and in some examples can provide an indication to the coherency block 325 when a write for the slot address is complete. Based on the indication that the write for the slot address is complete, the coherency block 325 can update the coherency record 330 to indicate that the slot address is no longer locked. The coherency block 325 can also provide a status update to a status queue, that the firmware 320 can cause the processing device 310 to check if a new read command is received.

In some examples, if a new read command is received prior to the slot buffer 335 indicating that the write for a slot address is complete, the coherency block 325 can provide a status that indicates that the slot address, logical address, or both, associated with the read command is locked. In some examples, if the read command is associated with a different logical address than the logical address that caused the slot address to be locked, the memory sub-system controller 305 can continue to provide the data from the different logical address. In some examples, if the new read command is received after the slot buffer 335 indicates that the write for a slot address is complete, the coherency block 325 can provide a status that indicates that the slot address, logical address, or both, associated with the read command is unlocked (i.e., may indicate a coherency miss), and that the processing device can continue with the read operation to read data from memory device(s) 340.

Figure 4:
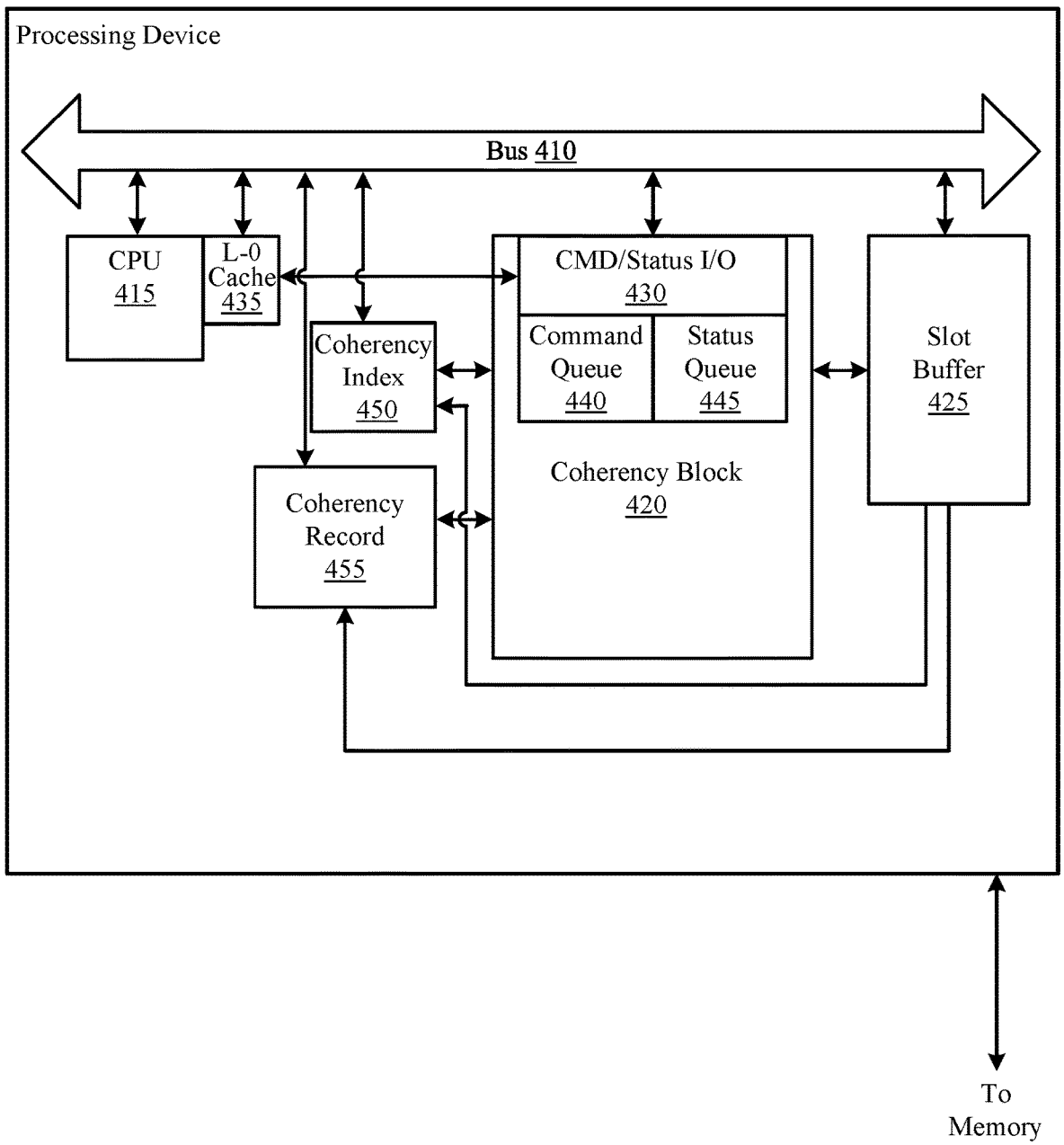
FIG. 4 is an example of a processing device with coherency check hardware in accordance with some examples of the present disclosure.

FIG. 4 illustrates an example of a processing device 400 with coherency check hardware for hardware-based coherency checking in accordance with some examples of the present disclosure. The processing device 400 can include a number of components, and in this example includes a bus 410, a CPU 415, a coherency block 420, a slot buffer 425, a coherency index 450 component, a coherency record 455 component, and a level-zero cache 435 that can act as a bridge between the CPU 415 and the coherency block 420. In some examples, the processing device 400 can be an example of a memory sub-system controller 115 of FIG. 1, and can execute operations such as described with reference to FIG. 2.

In some examples, the processing device 400 can operate according to instructions in firmware (e.g., firmware 320 of FIG. 3). The coherency block 420, in this example, includes a command/status input/output interface 430 that can receive coherency commands and can output coherency status. In some examples, the coherency commands and coherency status can be input and output through a level-zero cache 435, which can be coupled with CPU 415. For example, the command/status input/output interface 430 can include a command queue 440 and a status queue 445. In such examples, the CPU 415, when issuing a coherency command (e.g., based on a write operation at one or more associated memory device(s)), can place the command into the command queue 440, which can be an assigned area in the level-zero cache 435. Likewise, the coherency block 420, when providing coherency status, can place the status into the status queue 445, which can be an assigned area in the level-zero cache 435. Thus, in such examples, the level-zero cache 435 can be used to exchange command and status information, and thus avoid providing command and status information over bus 410 (e.g., an advanced high-performance bus (AHB) or advanced peripheral bus (APB)). By avoiding use of the bus 410, latency associated with coherency commands and status can be reduced relative to if the bus 410 were used (e.g., due to latency associated with bus access), and also efficiency of the bus 410 can be enhanced through reduced traffic associated with coherency commands and status, which can further enhance the efficiency of the processing device 400.

Further, in some examples, coherency operations can be based on a single coherency command that is provided to the command queue 440 by the CPU 415 (e.g., via the level-zero cache 435). For example, the coherency block 420 can receive a coherency command from the CPU 415 via the command queue 440 and the command/status input/output interface 430. The CPU 415, after the coherency command is provided to the coherency block 420, can proceed to perform other functions unrelated to the particular coherency command. In the example, of FIG. 4, the coherency block 420 is coupled with a coherency index 450, a coherency record 455, and a slot buffer 425. The coherency block 420 can also be coupled with bus 410. Further, such an architecture can allow the CPU 415 to write the coherency command to the command queue 440 asynchronously relative to command transmissions via the bus 410.

The coherency block 420 can receive the coherency command, which may be an example of a first command that is received at the coherency block 420. In some examples, the coherency command can include a logical address associated with a write operation. In some examples, the coherency block 420 can access the coherency index 450 (e.g., a systag allocation block) that can provide a mapping between logical addresses and slot addresses that represent slots that can be written to and read from memory. For example, the coherency index 450, which may be an example of a slot index block or logical address allocation block, can provide a slot address as a buffer slot index.

In some examples, the coherency block 420 can update the coherency record 455 to indicate that the slot address associated with the logical address is locked. The slot address associated with the logical address may be an example of a first entry of the coherency record 455. In some examples, coherency record 455 can include a systag table that includes entries of slot addresses, logical addresses, or combinations thereof, that have associated write operations at the slot buffer 425. The coherency record 455 can be an example, of a logical address record storage block of the processing device 400. The slot buffer 425 can manage read and write operations based on the slot addresses, and in some examples can provide an indication to the coherency block 420 when a write for the slot address is complete. Based on the indication that the write for the slot address is complete, the coherency block 420 can update the coherency record 455 to indicate that the slot address is no longer locked, and thereby release the associated entry in the coherency record 455. The coherency block 420 can also provide a status update to the status queue 445, that the CPU 415 can check to determine whether coherency is locked for logical address, slot address, or both.

In some examples, if a new read command is received prior to the slot buffer 425 indicating that the write for a slot address is complete, the coherency block 420 can provide a status (e.g., at status queue 445) that indicates that the slot address, logical address, or both, associated with the read command is locked. In some examples, if the read command is associated with a different logical address than the logical address that caused the slot address to be locked, the CPU 415 can continue to provide the data from the different logical address. In some examples, if the new read command is received after the slot buffer 425 indicates that the write for a slot address is complete, the coherency block 420 can provide a status that indicates that the slot address, logical address, or both, associated with the read command is unlocked (i.e., can indicate a coherency miss), and that the CPU 415 can continue with the read operation to read data from memory.

Figure 5:
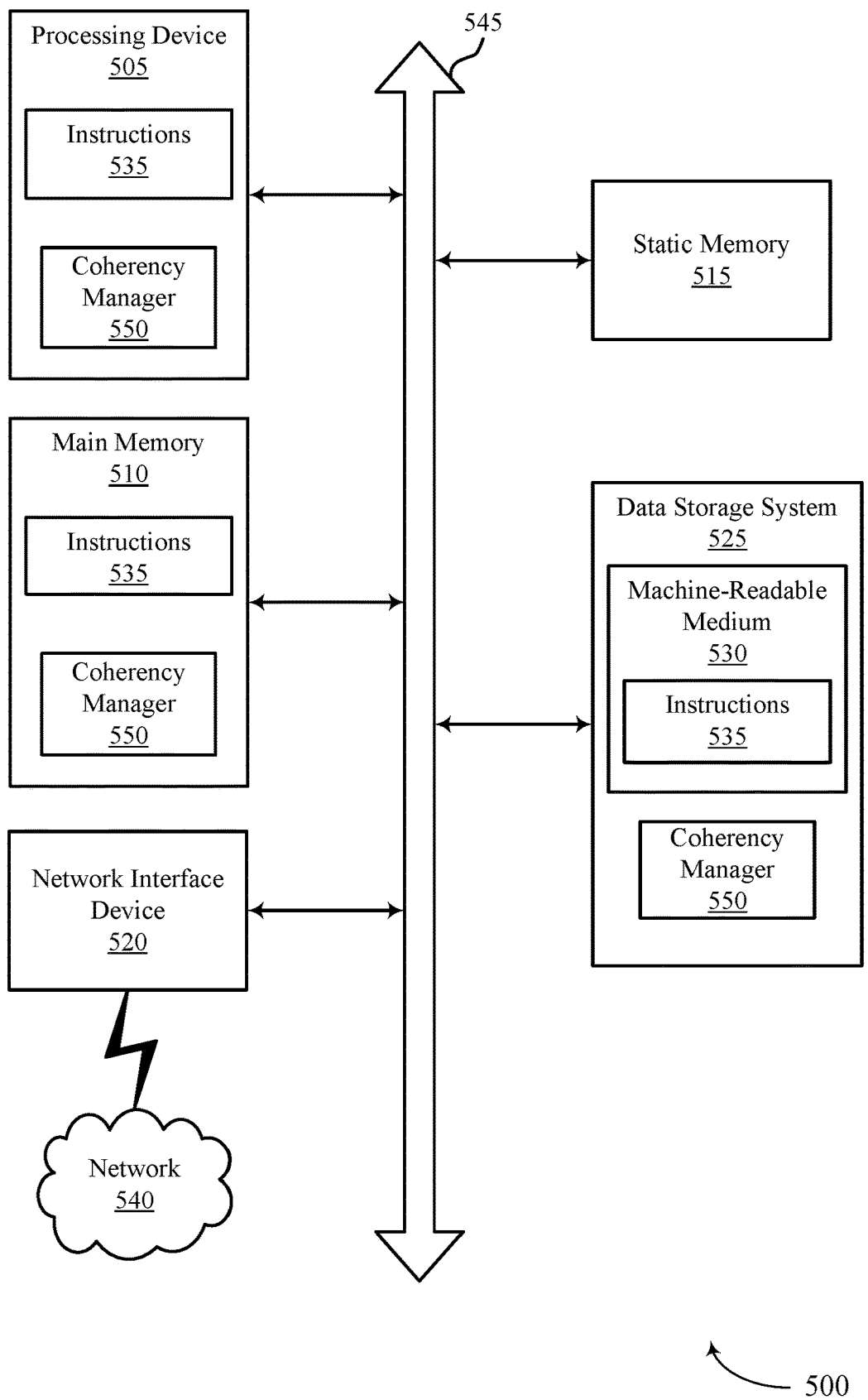
FIG. 5 is a block diagram of an example computer system in which examples of the present disclosure can operate.

FIG. 5 illustrates an example machine of a computer system 500 that supports hardware-based coherency checking in accordance with examples as disclosed herein. The computer system 500 can include a set of instructions, for causing the machine to perform any one or more of the techniques described herein. In some examples, the computer system 500 can correspond to a host system (e.g., the host system 105 described with reference to FIG. 1 or 2) that includes, is coupled with, or utilizes a memory sub-system (e.g., the memory sub-system 110 described with reference to FIG. 1) or can be used to perform the operations of a controller (e.g., to execute an operating system to perform operations to provide coherency commands to the coherency manager 150 described with reference to FIG. 1). In some examples, the machine can be connected (e.g., networked) with other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 500 can include a processing device 505, a main memory 510 (e.g., ROM, flash memory, DRAM such as SDRAM or Rambus DRAM (RDRAM), etc.), a static memory 515 (e.g., flash memory, static RAM (SRAM), etc.), and a data storage system 525, which communicate with each other via a bus 545.

Processing device 505 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 505 can also be one or more special-purpose processing devices such as an ASIC, an FPGA, a DSP, network processor, or the like. The processing device 505 is configured to execute instructions 535 and includes coherency manager 550 hardware for performing the operations and steps discussed herein. The computer system 500 can further include a network interface device 520 to communicate over the network 540.

The data storage system 525 can include a machine-readable storage medium 530 (also known as a computer-readable medium) on which is stored one or more sets of instructions 535 or software embodying any one or more of the methodologies or functions described herein. The instructions 535 can also reside, completely or at least partially, within the main memory 510 and/or within the processing device 505 during execution thereof by the computer system 500, the main memory 510 and the processing device 505 also constituting machine-readable storage media. The data storage system 525, main memory 510, or both, can include coherency manager 550 hardware that can perform any one or more of the methodologies or functions described herein. The machine-readable storage medium 530, data storage system 525, and/or main memory 510 can correspond to a memory sub-system.

In one example, the instructions 535 include instructions to implement functionality corresponding to coherency manager 550 hardware (e.g., the coherency manager 150 described with reference to FIG. 1, processing device 310 described with reference to FIG. 3, the processing device 400 described with reference to FIG. 4, or combinations thereof). While the machine-readable storage medium 530 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine (e.g., a computer) readable storage medium such as ROM, RAM, magnetic disk storage media, optical storage media, flash memory components, etc.

In the foregoing specification, examples of the disclosure have been described with reference to specific example examples thereof. It will be evident that various modifications can be made thereto without departing from the broader spirit and scope of examples of the disclosure as set forth in the following claims. The specification and drawings are, accordingly, to be regarded in an illustrative sense rather than a restrictive sense.

What is claimed is:

1. A method, comprising:
identifying a first slot identification associated with a first command;
locking a first entry of a coherency record associated with the first slot identification based at least in part on identifying the first command;
determining that a write operation associated with the first entry of the coherency record is complete based at least in part on locking the first entry of the coherency record; and
releasing the first entry of the coherency record based at least in part on determining that the write operation associated with the first entry of the coherency record is complete.

2. The method of claim 1, further comprising:
receiving a second command based at least in part on locking the first entry of the coherency record associated with the first slot identification, wherein the second command comprises a coherency check for the first slot identification that is associated with a first logical address of the first command; and
transmitting an indication that the first slot identification is locked based at least in part on receiving the second command.

3. The method of claim 1, further comprising:
receiving a third command based at least in part on locking the first entry of the coherency record associated with the first slot identification, wherein the third command comprises a read command for data associated with a first logical address of the first command; and
refraining from reading the data based at least in part on receiving the third command and the first slot identification being locked.

4. The method of claim 3, further comprising:
determining that the first slot identification is locked based at least in part on receiving the third command; and
buffering the third command based at least in part on determining that the first slot identification is locked.

5. The method of claim 4, further comprising:
reading the data based at least in part on buffering the third command and the first slot identification being released.

6. The method of claim 1, wherein releasing the first entry of the coherency record comprises:
unlocking the first entry of the coherency record associated with the first slot identification.

7. The method of claim 1, further comprising:
receiving the first command from a host system, wherein the first command is received in a command queue of a coherency block and is associated with a write command of a plurality of memory components that are associated with at least a first logical address of the first command.

8. The method of claim 7, wherein:
the command queue is located in a cache that is coupled with the coherency block and a processing device, and wherein the processing device writes the first command to the command queue asynchronously relative to command transmissions via a system bus that is coupled with the processing device.

9. An apparatus, comprising:
a bank of non-volatile memory; and
a controller coupled with the bank of non-volatile memory, wherein the controller is operable to cause the apparatus to:
    identify a first slot identification associated with the bank of non-volatile memory based at least in part on receiving a first command;
    lock a first entry of a coherency record associated with the first slot identification based at least in part on identifying the first slot identification of the bank of non-volatile memory;
    determine that a write operation associated with the first entry of the coherency record is complete based at least in part on locking the first entry of the coherency record; and
    release the first entry of the coherency record based at least in part on determining that the write operation associated with the first entry of the coherency record is complete.

10. The apparatus of claim 9, wherein the controller is operable to cause the apparatus to:
receive a second command based at least in part on locking the first entry of the coherency record associated with the first slot identification, wherein the second command comprises a coherency check for the first slot identification associated with a first logical address of the bank of non-volatile memory; and
transmit an indication that the first slot identification is locked based at least in part on receiving the second command.

11. The apparatus of claim 9, wherein the controller is operable to cause the apparatus to:
receive a third command based at least in part on locking the first entry of the coherency record associated with the first slot identification, wherein the third command comprises a read command for data associated with a first logical address of the bank of non-volatile memory; and
refrain from reading the data based at least in part on receiving the third command and the first slot identification being locked.

12. The apparatus of claim 11, wherein the controller is operable to cause the apparatus to:
determine that the first slot identification is locked based at least in part on receiving the third command; and
buffer the third command based at least in part on determining that the first slot identification is locked.

13. The apparatus of claim 12, wherein the controller is operable to cause the apparatus to:
read the data based at least in part on buffering the third command and the first slot identification being unlocked.

14. The apparatus of claim 9, wherein the controller is operable to cause the apparatus to:
receive the first command from a host system, wherein the first command is received in a command queue of a coherency block and is associated with a write command of a plurality of non-volatile memory cells of the bank of non-volatile memory that are associated with at least a first logical address of the bank of non-volatile memory.

15. The apparatus of claim 14, wherein:
the command queue is located in a cache that is coupled with the coherency block, the bank of non-volatile memory, and the controller, and wherein the controller is operable to cause the apparatus to:
    write the first command to the command queue asynchronously relative to command transmissions via a system bus that is coupled with the controller.

16. A non-transitory computer-readable medium storing code comprising instructions which, when executed by a processor of a memory device, cause the memory device to:
identify a first slot identification associated with a first command;
lock a first entry of a coherency record associated with the first slot identification based at least in part on identifying the first command;
determine that a write operation associated with the first entry of the coherency record is complete based at least in part on locking the first entry of the coherency record; and
release the first entry of the coherency record based at least in part on determining that the write operation associated with the first entry of the coherency record is complete.

17. The non-transitory computer-readable medium of claim 16, wherein the instructions, when executed by the processor of the memory device, further cause the memory device to:
receiving a second command based at least in part on locking the first entry of the coherency record associated with the first slot identification, wherein the second command comprises a coherency check for the first slot identification associated with a first logical address of the first command; and
transmitting an indication that the first slot identification is locked based at least in part on receiving the second command.

18. The non-transitory computer-readable medium of claim 16, wherein the instructions, when executed by the processor of the memory device, further cause the memory device to:
receive a third command based at least in part on locking the first entry of the coherency record associated with the first slot identification, wherein the third command comprises a read command for data associated with a first logical address of the first command; and
refrain from reading the data based at least in part on receiving the third command and the first slot identification being locked.

19. The non-transitory computer-readable medium of claim 18, wherein the instructions, when executed by the processor of the memory device, further cause the memory device to:
determine that the first slot identification is locked based at least in part on receiving the third command; and
buffer the third command based at least in part on determining that the first slot identification is locked.

20. The non-transitory computer-readable medium of claim 19, wherein the instructions, when executed by the processor of the memory device, further cause the memory device to:
    read the data based at least in part on buffering the third command and the first slot identification being released.

* * * * *